United States Patent
Chen et al.

(10) Patent No.: US 9,743,379 B2
(45) Date of Patent: Aug. 22, 2017

(54) METHOD AND SERVER FOR BROADCASTING A DATA FILE TO A PLURALITY OF RADIO TALK GROUPS

(71) Applicant: MOTOROLA SOLUTIONS, INC., Schaumburg, IL (US)

(72) Inventors: Dajun Chen, Sichuan (CN); Xun Fei, Sichuan (CN); Wen Feng, Sichuan (CN); Yahui Gong, Sichuan (CN); Yong Tian, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/122,122

(22) PCT Filed: Jun. 12, 2015

(86) PCT No.: PCT/CN2015/081362
§ 371 (c)(1),
(2) Date: Aug. 26, 2016

(87) PCT Pub. No.: WO2016/197391
PCT Pub. Date: Dec. 15, 2016

(65) Prior Publication Data
US 2017/0156127 A1 Jun. 1, 2017

(51) Int. Cl.
*H04W 4/06* (2009.01)
*H04W 68/00* (2009.01)
*H04W 28/02* (2009.01)

(52) U.S. Cl.
CPC ........... *H04W 68/005* (2013.01); *H04W 4/06* (2013.01); *H04W 28/0231* (2013.01)

(58) Field of Classification Search
CPC .. H04W 68/005; H04W 4/06; H04W 28/0231
(Continued)

(56) References Cited

U.S. PATENT DOCUMENTS 5,388,212 A * 2/1995 Grube ................... G06F 11/006
                                                        379/118
5,469,569 A * 11/1995 Grube ................... G06F 11/006
(Continued)

FOREIGN PATENT DOCUMENTS

CN       1341309        3/2002
EP        959635       11/1999
(Continued)

OTHER PUBLICATIONS

PCT/CN2015/081362 International Search Report and Written Opinion of the International Searching Authority dated Feb. 24, 2016 (8 pages).

(Continued)

*Primary Examiner* — Hai V Nguyen
(74) *Attorney, Agent, or Firm* — Michael Best & Friedrich LLP

(57) ABSTRACT

A method and server for broadcasting a data file to talk groups. The method includes fragmenting the data file into data blocks and broadcasting the data blocks to the talk groups. The method also includes detecting a voice call start event based on a first change is a received voice call status. The method further includes detecting a voice call end event based on a second change in the received voice call status. The method also includes generating a backlog item. The backlog item includes a subset of data blocks of the plurality of data blocks. The subset of data blocks were broadcasted on the broadcast data channel after the voice call start event and prior to the voice call end event. The method further includes broadcasting the subset of data blocks on the broadcast data channel upon detection of the voice call end event.

18 Claims, 4 Drawing Sheets

(58) Field of Classification Search
USPC .......................................................... 455/518
See application file for complete search history.

(56) References Cited

U.S. PATENT DOCUMENTS

| | | | | |
|---|---|---|---|---|
| 5,502,831 | A * | 3/1996 | Grube | G06F 11/006 |
| | | | | 711/100 |
| 5,594,725 | A * | 1/1997 | Tischler | H04N 7/148 |
| | | | | 348/14.09 |
| 5,933,780 | A * | 8/1999 | Connor | H04W 84/08 |
| | | | | 455/413 |
| 6,101,547 | A * | 8/2000 | Mukherjee | H04N 21/2312 |
| | | | | 709/230 |
| 6,253,091 | B1 * | 6/2001 | Naddell | H04W 4/08 |
| | | | | 455/416 |
| 6,385,461 | B1 * | 5/2002 | Raith | H04W 76/002 |
| | | | | 455/466 |
| 6,621,803 | B2 * | 9/2003 | Halton | H04W 74/0833 |
| | | | | 370/320 |
| 6,629,284 | B1 * | 9/2003 | Leermakers | H04H 20/91 |
| | | | | 714/748 |
| 6,763,226 | B1 * | 7/2004 | McZeal, Jr. | H04B 7/18595 |
| | | | | 370/354 |
| 6,847,827 | B2 * | 1/2005 | Helm | H04L 12/5695 |
| | | | | 370/322 |
| 6,850,504 | B1 * | 2/2005 | Cao | H04W 72/0413 |
| | | | | 370/335 |
| 6,885,874 | B2 * | 4/2005 | Grube | H04W 84/08 |
| | | | | 455/404.2 |
| 7,058,035 | B2 * | 6/2006 | English | H04W 36/18 |
| | | | | 370/332 |
| 7,065,058 | B1 * | 6/2006 | Korus | H04W 4/06 |
| | | | | 370/312 |
| 7,139,586 | B2 * | 11/2006 | Kreitzer | H04W 8/22 |
| | | | | 455/414.1 |
| 7,444,578 | B2 * | 10/2008 | Meyer | H04L 1/1874 |
| | | | | 714/748 |
| 7,809,481 | B2 * | 10/2010 | Okada | G05B 23/0264 |
| | | | | 701/31.4 |
| RE42,452 | E * | 6/2011 | Halton | H04W 74/0833 |
| | | | | 370/320 |
| 7,962,166 | B1 * | 6/2011 | Trandai | H04W 8/205 |
| | | | | 455/420 |
| 8,000,731 | B2 * | 8/2011 | Varotto | H04W 4/08 |
| | | | | 455/509 |
| RE43,669 | E * | 9/2012 | Halton | H04W 74/0833 |
| | | | | 370/320 |
| 8,543,080 | B2 | 9/2013 | Dillinger et al. | |
| 8,565,802 | B2 * | 10/2013 | Mistro | H04W 72/121 |
| | | | | 455/519 |
| 8,630,170 | B2 * | 1/2014 | Hu | H04B 1/0003 |
| | | | | 370/230 |
| 8,639,278 | B1 * | 1/2014 | Samios | H04W 76/005 |
| | | | | 455/422.1 |
| RE44,809 | E * | 3/2014 | Halton | H04W 74/0833 |
| | | | | 370/320 |
| 8,675,614 | B2 * | 3/2014 | Kuehner | H04W 48/10 |
| | | | | 370/336 |
| 8,700,467 | B2 * | 4/2014 | Ha | G06Q 30/02 |
| | | | | 370/312 |
| 8,781,515 | B2 * | 7/2014 | Agulnik | H04W 4/08 |
| | | | | 455/518 |
| 8,848,790 | B2 * | 9/2014 | Fujihara | H04N 19/00054 |
| | | | | 375/240.05 |
| 8,856,003 | B2 * | 10/2014 | Chong | H04W 4/10 |
| | | | | 379/67.1 |
| 8,892,147 | B2 * | 11/2014 | Bhaskaran | H04W 76/005 |
| | | | | 455/518 |
| 8,892,148 | B2 * | 11/2014 | Bhaskaran | H04W 76/005 |
| | | | | 370/395.3 |
| 8,949,413 | B2 * | 2/2015 | Ramaraj | H04L 63/0263 |
| | | | | 709/220 |
| 9,131,344 | B2 * | 9/2015 | Chowdhary | H04W 4/08 |
| 9,167,381 | B2 * | 10/2015 | McDonald | H04W 4/021 |
| 9,185,472 | B2 * | 11/2015 | Klemettinen | H04Q 3/72 |
| 9,207,988 | B2 * | 12/2015 | Ganguli | G06F 9/5072 |
| 9,344,554 | B2 * | 5/2016 | Kim | G06F 3/0488 |
| 9,590,814 | B2 * | 3/2017 | Pazos | H04L 12/189 |
| 2002/0018462 | A1 * | 2/2002 | Thompson | H04W 72/04 |
| | | | | 370/352 |
| 2003/0012138 | A1 * | 1/2003 | Abdelilah | H04L 12/5695 |
| | | | | 370/231 |
| 2003/0046032 | A1 * | 3/2003 | Puthiyedath | H04L 12/2697 |
| | | | | 702/188 |
| 2003/0095528 | A1 * | 5/2003 | Halton | H04W 74/0875 |
| | | | | 370/342 |
| 2005/0041584 | A1 * | 2/2005 | Lau | H04L 41/0866 |
| | | | | 370/235 |
| 2006/0007943 | A1 * | 1/2006 | Fellman | H04L 1/0045 |
| | | | | 370/400 |
| 2006/0101116 | A1 * | 5/2006 | Rittman | H04L 12/1813 |
| | | | | 709/204 |
| 2006/0148467 | A1 * | 7/2006 | Kreitzer | H04W 8/22 |
| | | | | 455/426.1 |
| 2006/0156164 | A1 * | 7/2006 | Meyer | H04L 1/1874 |
| | | | | 714/749 |
| 2006/0209898 | A1 * | 9/2006 | Abdelilah | H04L 12/5695 |
| | | | | 370/477 |
| 2008/0037723 | A1 * | 2/2008 | Milstein | H04M 3/53375 |
| | | | | 379/88.12 |
| 2008/0181145 | A1 * | 7/2008 | Chowdhury | H04W 4/08 |
| | | | | 370/310 |
| 2008/0198929 | A1 * | 8/2008 | Fujihara | H04N 19/00054 |
| | | | | 375/240.13 |
| 2008/0318610 | A1 * | 12/2008 | Bhaskaran | H04L 65/403 |
| | | | | 455/518 |
| 2010/0113079 | A1 * | 5/2010 | Varotto | H04W 4/08 |
| | | | | 455/509 |
| 2010/0283735 | A1 * | 11/2010 | Kim | G06F 3/0488 |
| | | | | 345/168 |
| 2011/0116369 | A1 * | 5/2011 | Hu | H04B 1/0003 |
| | | | | 370/230 |
| 2011/0286595 | A1 * | 11/2011 | Resch | H04L 9/085 |
| | | | | 380/46 |
| 2012/0122510 | A1 * | 5/2012 | Mistro | H04W 72/121 |
| | | | | 455/519 |
| 2012/0165060 | A1 * | 6/2012 | Klemettinen | H04Q 3/72 |
| | | | | 455/518 |
| 2013/0007257 | A1 * | 1/2013 | Ramaraj | H04L 63/0263 |
| | | | | 709/224 |
| 2013/0036234 | A1 * | 2/2013 | Pazos | H04L 12/189 |
| | | | | 709/231 |
| 2013/0059622 | A1 * | 3/2013 | Agulnik | H04W 4/08 |
| | | | | 455/518 |
| 2013/0170475 | A1 * | 7/2013 | Kuehner | H04W 48/10 |
| | | | | 370/336 |
| 2013/0171934 | A1 * | 7/2013 | Stankovska | H04W 72/082 |
| | | | | 455/41.2 |
| 2013/0182681 | A1 * | 7/2013 | Sane | H04L 1/1685 |
| | | | | 370/331 |
| 2014/0006597 | A1 * | 1/2014 | Ganguli | G06F 9/5072 |
| | | | | 709/224 |
| 2014/0031019 | A1 * | 1/2014 | Qi | H04W 4/00 |
| | | | | 455/416 |
| 2014/0057645 | A1 * | 2/2014 | Chowdhary | H04W 4/08 |
| | | | | 455/456.1 |
| 2014/0137161 | A1 * | 5/2014 | Park | H04N 21/2221 |
| | | | | 725/62 |
| 2015/0181382 | A1 * | 6/2015 | McDonald | H04L 67/18 |
| | | | | 455/456.3 |
| 2015/0319297 | A1 * | 11/2015 | Beyer, Jr. | H04L 12/08 |
| | | | | 455/456.6 |
| 2015/0365920 | A1 * | 12/2015 | Khoo | H04W 4/02 |
| | | | | 370/230 |
| 2015/0381381 | A1 | 12/2015 | Dyson | |
| 2016/0050653 | A1 * | 2/2016 | Rastogi | H04W 72/0406 |
| | | | | 455/453 |

(56) References Cited

U.S. PATENT DOCUMENTS

| | | | | |
|---|---|---|---|---|
| 2016/0057390 A1* | 2/2016 | Ramalho | ............... | H04N 7/155 348/14.08 |
| 2016/0150455 A1* | 5/2016 | Suryavanshi | ....... | H04W 36/245 455/436 |
| 2016/0164963 A1* | 6/2016 | Ganguli | ............... | G06F 9/5072 709/226 |
| 2016/0239169 A1* | 8/2016 | Kim | ..................... | G06F 3/0488 |
| 2016/0241947 A1* | 8/2016 | Degraye | ................. | H04R 3/12 |
| 2016/0308765 A1* | 10/2016 | Le | ......................... | H04L 45/742 |
| 2017/0034672 A1* | 2/2017 | Pai | ......................... | H04W 4/08 |

FOREIGN PATENT DOCUMENTS

| | | |
|---|---|---|
| WO | 00/04453 | 1/2000 |
| WO | 02/060087 | 8/2002 |

OTHER PUBLICATIONS

Feng et al., "An efficient method of distributing large size data by dynamically adjusting sequence based on real-time missing status of receivers," specification, Jul. 13, 2015, Motorola Solutions, Inc. (6 pages).

\* cited by examiner

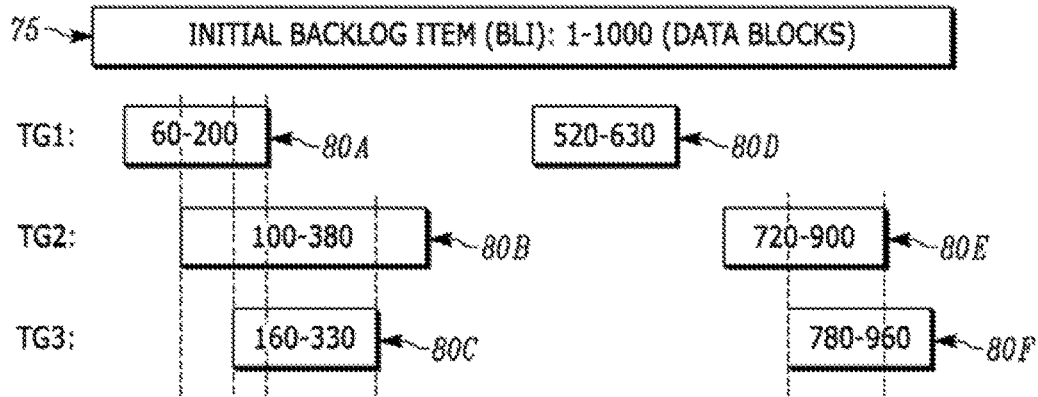
FIG. 2
FIG. 3
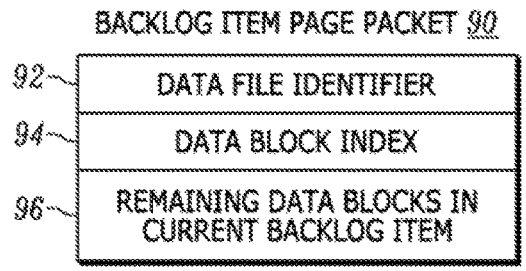
FIG. 4

METHOD AND SERVER FOR BROADCASTING A DATA FILE TO A PLURALITY OF RADIO TALK GROUPS

BACKGROUND OF THE INVENTION

Distributing a large data file, such as a firmware upgrade, in a wireless (e.g., radio) communication system with a large number of communication devices (e.g., radios) presents challenges. For example, it can be difficult to collect every single radio to download the data file via a physical connection to a computer (e.g., using a cable). Further, security concerns exist with sending the data file via Wi-Fi.

The data file can be broadcast to the radios on a radio frequency (RF) channel (e.g., a broadcast data channel). However, some of the radios can miss part of the data file broadcast because they are participating in voice calls with their talk group. Further, continuously broadcasting the entire data file results in rebroadcasting of parts of the data file that have already been received by the radios. In addition, the radios waste battery power and can miss out on voice talk while staying on the broadcast data channel to receive repetitious data broadcasts.

Accordingly, there is a need for broadcasting a data file to plurality of radio talk groups.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a broadcast of an exemplary initial backlog item, in accordance with some embodiments.

FIG. 3 is a diagram of a backlog item queue, in accordance with some embodiments.

FIG. 4 is a block diagram of a backlog item page packet, in accordance with some embodiments.

Figure 1:
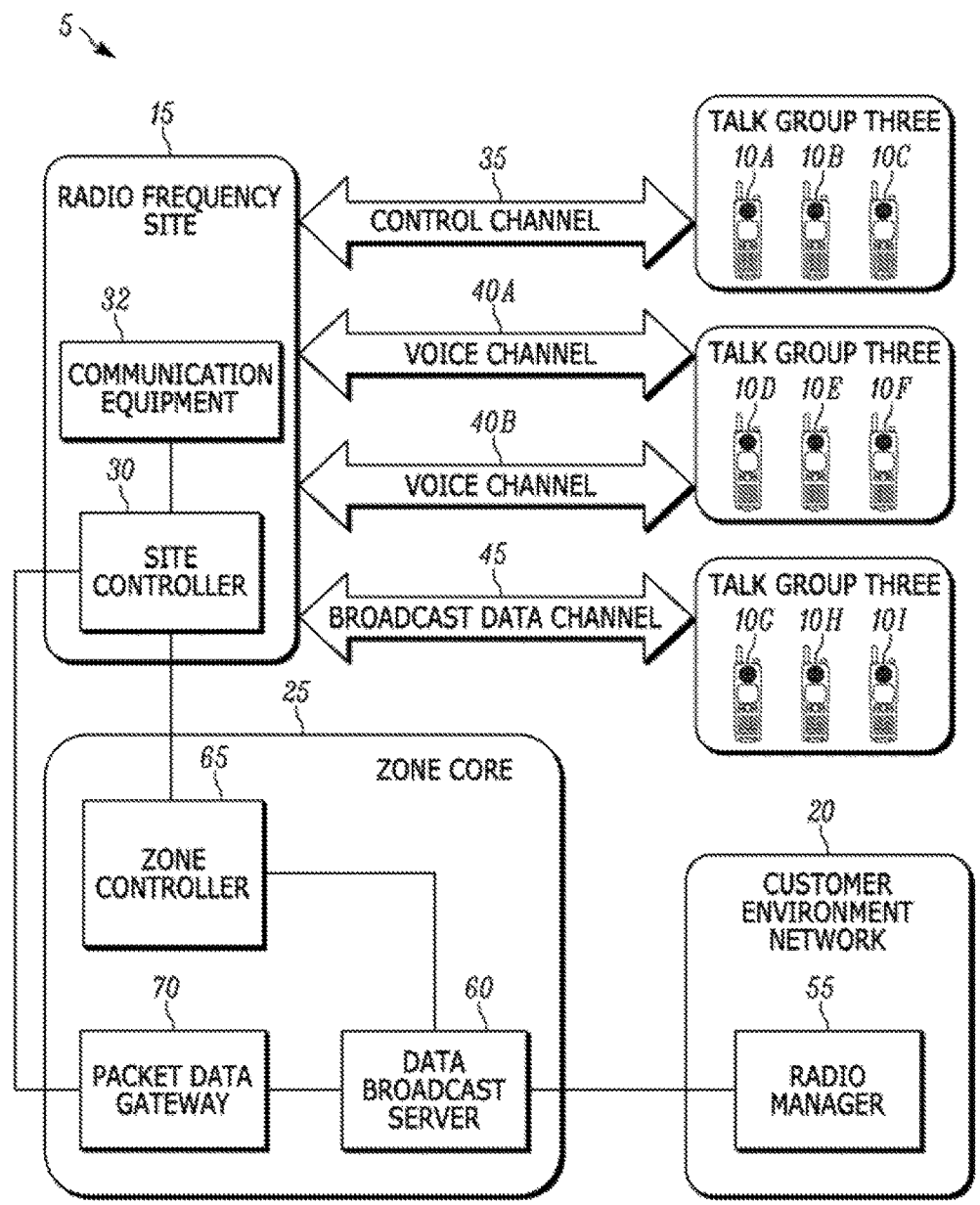
FIG. 1 is block diagram of a communication network, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments include a method of broadcasting a data file to a plurality of talk groups. The method includes fragmenting the data file into a plurality of data blocks and broadcasting the plurality of data blocks to the plurality of talk groups on a broadcast data channel. The method also includes detecting a voice call start event based on a first change in a received voice call status. The voice call start event identifies a beginning of a voice call that includes at least one talk group of the plurality of talk groups. The method further includes detecting a voice call end event based on a second change in the received voice call status. The voice call end event identifies a completion of the voice call that includes the at least one talk group. The method also includes generating a backlog item. The backlog item includes a subset of data blocks of the plurality of data blocks. The subset of data blocks were broadcast on the broadcast data channel after the voice call start event and prior to the voice call end event. The method further includes broadcasting the subset of data blocks on the broadcast data channel upon detection of the voice call end event.

Other exemplary embodiments include a data broadcast server. The data broadcast server is configured to fragment a data file into a plurality of data blocks and broadcast the plurality of data blocks to a plurality of talk groups in a broadcast data channel. The data broadcast server is also configured to detect a voice call start event based on a first change in a received voice call status. The voice call start event identifies a beginning of a voice call that includes at least one talk group of the plurality of talk groups. The data broadcast server is further configured to detect a voice call end event based on a second change the received voice call status. The voice call end event identifies a completion of the voice call that includes the at least one talk group. The data broadcast server is also configured to generate a backlog item. The backlog item includes a subset of data blocks of the plurality of data blocks. The subset of data blocks were broadcast on the broadcast data channel after the voice call start event and prior to the voice call end event. The data broadcast server is further configured to broadcast the subset of data blocks on the broadcast data channel upon detection of the voice call end event.

FIG. 1 illustrates a communication network 5. In some embodiments, the communication network 5 operates according to the Project 25 (P25) specification. In other embodiments, the communication network 5 operates using other specifications or protocols including, but not limited to, Terrestrial Trunked Radio (TETRA), Digital Mobile Radio (DMR), and Public Safety Long Term Evolution (LTE). The communication network 5 includes, among other components, radios 10A through 10I, a radio frequency (RF) site 15, a customer environment network 20, and a zone core 25. In some embodiments, the components and functionality of the RF site 15, the customer environment network 20, and the core 25, described below, can be located in a single device and/or a single location. In some embodiments, the components and functionality of the RF site 15, the customer environment network 20, and the zone core 25, described below, can be located in multiple devices and/or a multiple locations.

The RF site 15 includes, among other components, a site controller 30, and communication equipment 32 that supports/provides communications over a control channel 35, a plurality of voice channels 40A and 40B, and a broadcast data channel 45 (shown schematically). The control channel 35, the plurality of voice channels 40A and 40B, and the broadcast data channel 45 are radio-frequency channels. The radios 10A through 10I wirelessly communicate with the site controller 30. In the embodiment illustrated in FIG. 1, the radios 10A through 10I are arranged into three talk groups 50A through 50C.

A radio (e.g., radio 10A) initiates a voice call with the other radios 10B and 10C in its talk group 50A by sending a request to the site controller 30 on the control channel 35. The site controller 30 identifies a vacant voice channel (e.g., voice channel 40A) and instructs the radios 10B and 10C in the talk group 50A to monitor the voice channel 40A in order to participate in the voice call. In some embodiments, the site controller 30 instructs the other radios 10B and 10C in the talk group 50A to monitor the voice channel 40A by sending a signal on the control channel 35. When the voice call is complete, every radio 10A through 10C in the talk group 50A switches to monitoring the control channel 35 for additional voice calls.

The radios 10A through 10I receive data from the RF site 15 on the broadcast data channel 45. The broadcast data channel 45 can be used to concurrently provide the radios 10A through 10I in multiple talk groups 50A through 50C with the same data. In some embodiments, the radios 10A through 10I are unavailable to receive data on the broadcast data channel 45 while they are involved in voice calls. The site controller 30 sends a signal to the radios 10A through 10I on the control channel 35 while broadcasting data on the broadcast data channel 45. In some embodiments, the signal identifies the data. Radios 10A through 10I that are available to receive data on the broadcast data channel 45 can determine, based on the signal from the site controller 30, whether to monitor the broadcast data channel 45 and receive the data. Further, the site controller 30 sends voice call requests on the broadcast data channel 45 in order to notify radios 10A through 10I that they should switch to monitoring the control channel 35.

The customer environment network 20 includes, among other components, a radio manager 55. The radio manager 55 acquires a data file to distribute to the radios 10A through 10I. The data file may include, firmware, code plugs, bug fixes, image files, etc. The radio manager 55 sends the data file to the zone core 25.

The zone core 25 includes, among other components, a data broadcast server 60, a zone controller 65, and a packet data gateway 70. The data broadcast server 60 receives the data file from the radio manager 55, fragments the data file into a plurality of data blocks, and controls the distribution of the data blocks to the radios 10A through 10I. The data broadcast server 60 sends the data blocks to the site controller 30 via the packet data gateway 70. The data broadcast server 60 further detects when any of the three talk groups 50A through 50C fail to receive data blocks on the broadcast data channel 45 and generates a plurality of backlog items (BLIs). In some embodiments, each backlog item includes a subset of data blocks. In some embodiments, each backlog item includes a subset of data blocks and a subset of talk groups. In some embodiments, each backlog item includes a mutually exclusive subset of data blocks.

In some embodiments, the data broadcast server 60 generates and broadcasts an initial backlog item to the talk groups 50A through 50C. The initial backlog item includes every data block in the data file. FIG. 2 illustrates an exemplary initial backlog item broadcast 75 and a plurality of voice calls 80A through 80F that occur during the initial backlog item broadcast 75. The radios 10A through 10I fail to receive the data blocks that are broadcast while their talk groups 50A through 50C are involved in voice calls. For example, the radios 10A through 10C in talk group one 50A miss data blocks 60-200 due to voice call 80A, and data blocks 520-630 due to voice call 80D. As a further example, the radios 10A through 10I in all three talk groups 50A through 50C miss data blocks 160-700 due to voice calls 80A through 80C, respectively.

The data broadcast server 60 stores the plurality of backlog items in a prioritized queue for rebroadcasting the subsets of data blocks that the talk groups 50A through 50C failed to receive during the initial backlog item broadcast 75. FIG. 3 illustrates an exemplary queue 85 of backlog items generated by the data broadcast server 60 during the exemplary initial backlog item broadcast 75. After the initial backlog item broadcast 75, the backlog items in the queue 85 are broadcast one after another based on their priority in the queue 85. In some embodiments, the data broadcast server 60 prioritizes the backlog items according to the number (or quantity) of talk groups in each backlog item. For example, in FIG. 3, the highest priority backlog item 8 in the queue 85 includes three talk groups 50A through 50C. In some embodiments, the data broadcast server 60 prioritizes the backlog items according to the number (or quantity) of data blocks in each backlog item. In some embodiments, the data broadcast server 60 first prioritizes the backlog items in the queue 85 based on the number of talks groups in each backlog item, and then prioritizes them by the number of data blocks in each backlog item.

As explained above, the data broadcast server 60 detects when the talk groups 50A through 50C fail to receive data blocks on the broadcast data channel 45. In some embodiments, the data broadcast server 60 perform this detection based on a voice call status that is generated by the zone controller 63. The zone controller 65 communicates with the site controller 30 and generates a voice call status for the talk groups 50A through 50C. A change in the voice call status can indicate when one or more of the talk groups 50A through 50C start a voice call (e.g., a voice call start event). The voice call start event identifies a beginning of the voice call and thus identifies when the one or more talk groups 50A through 50C are unavailable to receive data blocks on the broadcast data channel 45. A change in the voice call status can also indicate when one or more of the talk groups 50A through 50C end a voice call (e.g., a voice call end event). The voice call end event identifies a completion of the voice call and thus identifies when the one or more talk groups are available to receive data blocks on the broadcast data channel 45. By monitoring the voice call status, the data broadcast server 60 detects when the talk groups 50A through 50C start and stop voice calls. The data broadcast server 60 generates the backlog items by correlating changes in the voice call status (e.g., voice call start events and voice call end events) with the data blocks that are broadcast on the broadcast data channel 45 when the changes occur. Further, in some embodiments, the data broadcast server 60 uses the voice call states to prioritize the rebroadcasting of the backlog items in the queue 85 according to the number of available talk groups. In other words, the backlog item in the queue 85 with the largest number of available talk groups receives the highest priority for rebroadcast. The data broadcast server 60 subsequently broadcasts every backlog heart in the queue 85 until it is empty.

While broadcasting the backlog items, the data broadcast server 60 identifies the data blocks that are currently being broadcasted to the radios 10A through 10I so that they can determine when to monitor the broadcast data channel 45. In some embodiments, the data broadcast server 60 sends a backlog item page packet 90 to the site controller 30, via the zone controller 65. The backlog item page packet 90 includes, among other components, a data file identifier 92, a data block index 94 of the data block that is currently being broadcasted in the broadcast data channel 45, and the remaining data blocks 96 in the current backlog item, as illustrated in FIG. 4. The site controller 30 sends the backlog item page packet 90 to the radios 10A through 10I on the control channel 35. Radios 10A through 10I that are monitoring the control channel 35 can switch to monitoring the broadcast data channel 45 if they have not received every data block in the current backlog item. In some embodiments, the site controller 30 also sends the backlog item page packet 90 on the plurality of voice channels 40A and 40B. For example, the site controller 30 sends the backlog item page packet on a voice channel 40A after completion of a voice call on that voice channel 40A.

Figure 5:
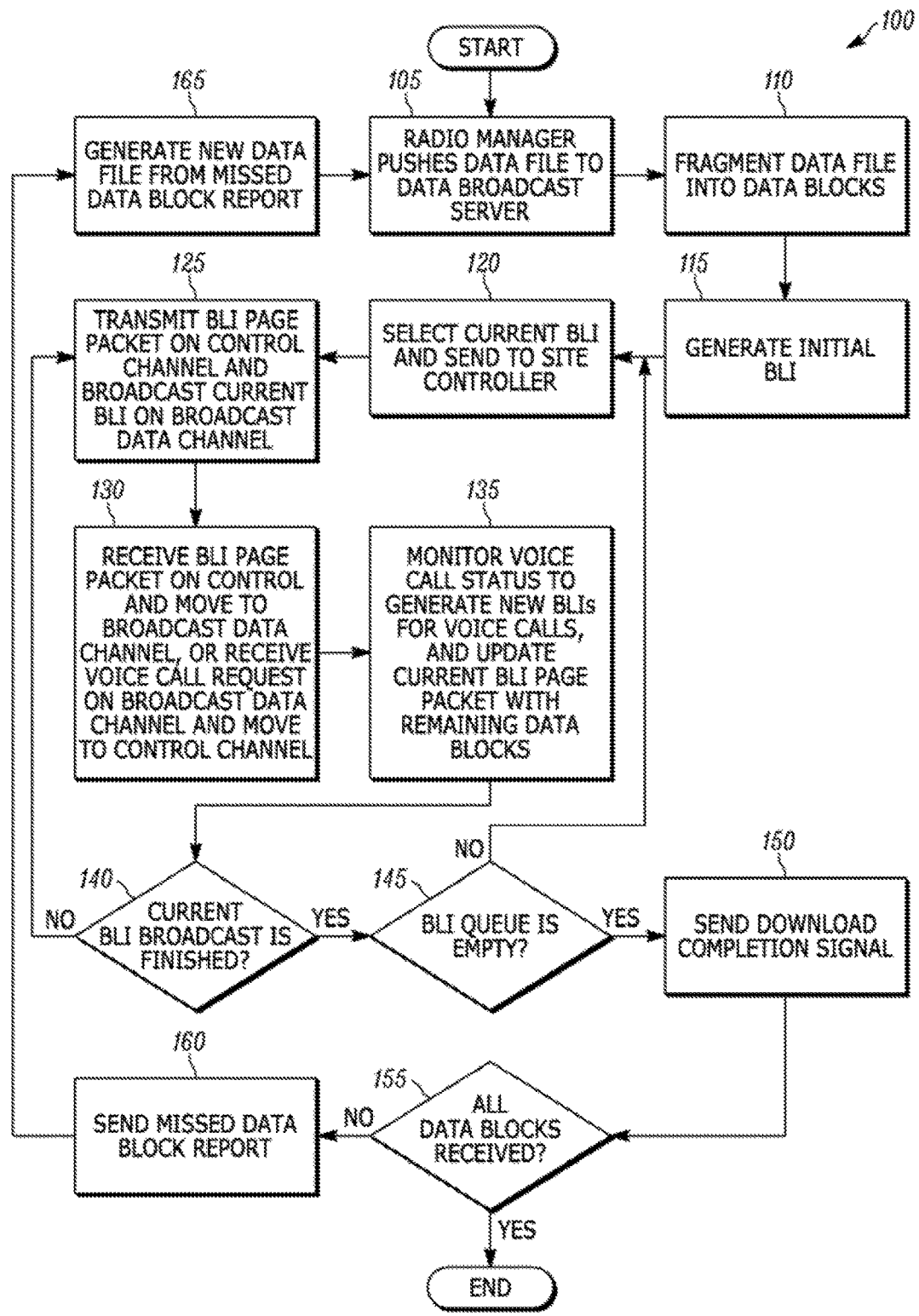
FIG. 5 is a flowchart of broadcasting a data file to a plurality of talk groups, in accordance with some embodiments.

FIG. 5 illustrates a method 100 (or process) for broadcasting a data file to the plurality of talk groups 50A through 50C. In step 105, the radio manager 55 pushes a data file to the data broadcast server 60. In step 110, the data broadcast server 60 fragments the data file into a plurality of data blocks. In step 115, the data broadcast server 60 generates an initial backlog item. The initial backlog item includes every data block in the plurality of data blocks. In step 120, the data broadcast server 60 selects a current backlog item with the most available talk groups and sends the current backlog item to the site controller 30.

In step 125, the site controller 30 transmits a backlog item page packet 90 on the control channel 35 and then broadcasts the data blocks of the current backlog item on the broadcast data channel 45. In step 130, the radios 10A through 10I receive the backlog stent page packet 90 on the control channel 35 and monitor the broadcast data channel 45 to receive the data blocks of the current backlog item. In some embodiments, the radios 10A through 10I receive a voice call request on the broadcast data channel 45 and move to the control channel 35 to participate in a voice call.

In step 135, the data broadcast server 60 monitors the voice call status (e.g., from the zone controller 65) to generate new backlog items when radios 10A through 10I miss receiving data blocks due to being involved in video calls. Also, in step 135, the data broadcast server 60 updates the current backlog item to reflect data blocks that have already been broadcast. In step 140, the data broadcast server 60 determines whether the current backlog item has finished broadcasting. The site controller 30 sends an updated backlog item page packet 90 on the control channel 35, when the current backlog item is not finished broadcasting (i.e., returns to step 125). Alternatively, the data broadcast server 60 determines whether the backlog item queue 85 is empty (i.e., proceeds to step 145).

The data broadcast server 60 picks a new current backlog item (i.e. returns to step 120) when the backlog item queue 85 is not empty. Alternatively, the data broadcast server 60 sends a download completion signal to the radios 10A through 10I when the backlog item is empty (i.e., proceeds to step 150). Upon receiving the download completion signal, the radios 10A through 10I determine whether they have received every data block in the data file (step 150). The radios 10A through 10I send a missed data block report to the radio manager 55 when they have not received every data block in the data file (step 160). In step 165, the radio manager 55 generates a second data file based on the missed data block report. The second data file includes the missed data blocks. The method 100 then returns to step 105.

In some embodiments, the method 100 terminates if the radios 10A through 10I have received all of the data blocks in the data file. In other embodiments, the method 100 proceeds to step 105 to receive a new data file.

Figure 6:
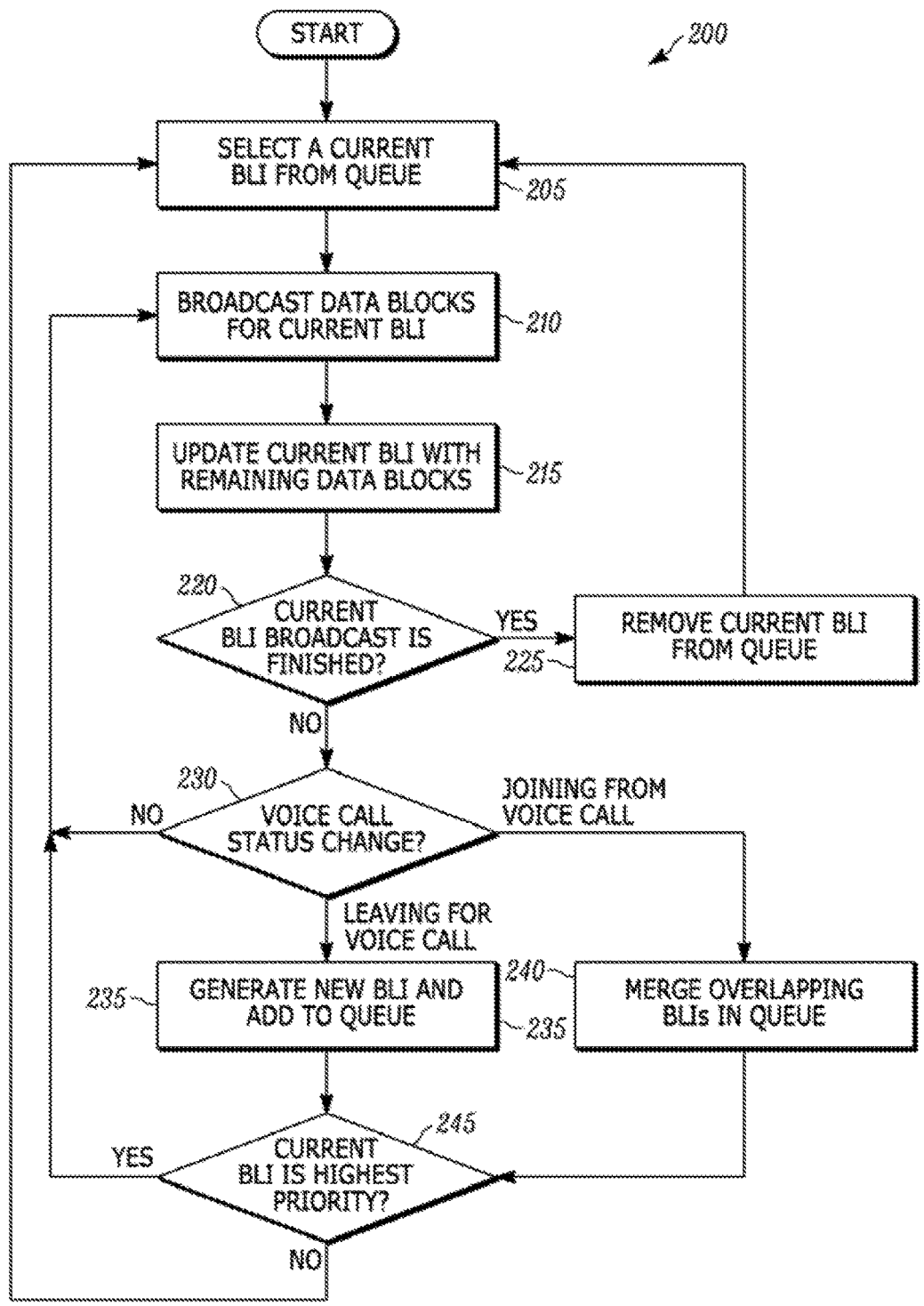
FIG. 6 is a flowchart for dynamically creating backlog items, in accordance with some embodiments.

FIG. 6 illustrates a method 200 (or process) for dynamically creating new backlog item. In step 205, the data broadcast server 60 selects a current backlog item with the most available talk groups from the backlog item queue 85. For instance, the data broadcast server 60 monitors the voice call status from the zone controller 65. In step 210, the data block for the current backlog item is broadcast, e.g. on the broadcast data channel 45. In step 215, the current backlog item is updated with the remaining data blocks.

In step 220, the data broadcast server 60 determines if the current backlog item broadcast is finished. The data broadcast server 60 removes the current backlog item from the queue 85 (step 225) and picks a new current backlog item (i.e., returns to step 205) when the current backlog item broadcast is finished. Alternatively, the data broadcast server 60 determines if the voice call status for any of the talks groups has changed (step 230). Broadcasting of the data blocks in the current backlog item continues (i.e., returns to step 210) when the voice call status is unchanged. A new backlog stem is generated and added to the queue 85 (step 235) when a talk group leaves for a voice call. For instance, the current backlog item is broken down into two parts. One part includes the talk groups that leave for the voice call. The other part includes talk groups that are still receiving the current backlog item broadcast. Overlapping backlog items in the queue 85 are merged when talk groups join from voice calls (step 240).

In step 245, the data broadcast server 60 determines whether the current backlog item is the highest priority in the queue 85. For instance, another backlog item can have the most available talk groups when a plurality of talk groups in the current backlog item leave for a voice call. Broadcasting of the data blocks in the current backlog item continues (i.e., returns to step 210) when the current backlog item has the most available talk groups. Alternatively, the data broadcast server 60 picks a new current backlog item (i.e., returns to step 205) when the current backlog item is not the highest priority (e.g., another backlog item in the queue 85 has the most available talk groups).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%. In another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of broadcasting a data file to a plurality of talk groups, the method comprising:
    fragmenting the data file into a plurality of data blocks;
    broadcasting the plurality of data blocks to the plurality of talk groups on a broadcast data channel;
    detecting a voice call start event based on a first change in a received voice call status, wherein the voice call start event identifies a beginning of a voice call including at least one talk group of the plurality of talk groups;
    detecting a voice call start event based on a second change in the received voice call status, wherein the voice call end event identifies a completion of the voice call including the at least one talk group;
    generating a backlog item, wherein the backlog item includes a subset of data blocks of the plurality of data blocks, wherein the subset of data blocks were broadcast on the broadcast data channel after the voice call start event and prior to the voice call end event; and
    broadcasting the subset of data blocks on the broadcast data channel upon detection of the voice call end event.

2. The method of claim 1, further comprising:
    detecting a plurality of voice call start events based on a first plurality of changes of the received voice call status;
    detecting a plurality of voice call end events based on a second plurality of changes of the received voice call status; and
    generating a plurality of backlog items.

3. The method of claim 2, further comprising:
    tracking a quantity of talk groups for each of the plurality of backlog items; and
    prioritizing rebroadcast, on the broadcast data channel, of the subset of data blocks for each of the plurality of backlog items based on the quantity of talk groups.

4. The method of claim 2, further comprising:
    tracking a quantity of data blocks for each of the plurality of backlog items; and
    prioritizing rebroadcast, on the broadcast data channel, of the subset of data blocks for each of the plurality of backlog items based on the quantity of data blocks.

5. The method of claim 2, further comprising:
    tracking a quantity of talk groups for each of the plurality of backlog items;
    tracking a quantity of data blocks for each of the plurality of backlog items; and
    prioritizing rebroadcast, on the broadcast data channel, of the subset of data blocks for each of the plurality of backlog items based first on the quantity of talk groups and based second on the quantity of data blocks.

6. The method of claim 2, wherein each of the plurality of backlog items includes a mutually exclusive subset of data blocks of the plurality of data blocks.

7. The method of claim 1, further comprising broadcasting a backlog item page packet on a control channel while broadcasting the subset of data blocks on the broadcast data channel.

8. The method of claim 7, wherein the backlog item page packet includes a data file identifier and a data block index.

9. The method of claim 7, further comprising broadcasting the backlog item page packet on a voice channel while broadcasting the subset of data blocks on the broadcast data channel.

10. A data broadcast server configured to:
fragment a data file into a plurality of data blocks;
broadcast the plurality of data blocks to a plurality of talk groups on a broadcast data channel;
detect a voice call start event based on a first change in a received voice call status, wherein the voice call start event identities a beginning of a voice call including at least one talk group of the plurality of talk groups;
detect a voice call end event based on a second change in the received voice call status, wherein the voice call end event identifies a completion of the voice call including the at least one talk group;
generate a backlog item, wherein the backlog item includes a subset of data blocks of the plurality of data blocks, wherein the subset of data blocks were broadcast on the broadcast data channel after the voice call start event and prior to the voice call end event; and
broadcast the subset of data blocks on the broadcast data channel upon detection of the voice call end event.

11. The data broadcast server of claim 10, wherein the data broadcast server is further configured to
detect a plurality of voice call start events based on a first plurality of changes of the received voice call status;
detect a plurality of voice call end events based on a second plurality of changes of the received voice call status; and
generate a plurality of backlog items.

12. The data broadcast server of claim 11, wherein the data broadcast server is further configured to
track a quantity of data blocks for each of the plurality of backlog items; and
prioritize rebroadcast, on the broadcast data channel, of the subset of data blocks for each of the plurality of backlog items based on the quantity of data blocks.

13. The data broadcast server of claim 11, wherein the data broadcast server is further configured to
track a quantity of data blocks for each of the plurality of backlog items; and
prioritize rebroadcast, on the broadcast data channel, of the subset of data blocks for each of the plurality of backlog items based on the quantity of data blocks.

14. The data broadcast server of claim 11, wherein the data broadcast server is further configured to
track a quantity of talk groups for each of the plurality of backlog items;
track a quantity of data blocks for each of the plurality of backlog items; and
prioritize rebroadcast of the subset of data blocks on the broadcast data channel, for each of the plurality of backlog items based first on the quantity of talk groups and based second on the quantity of data blocks.

15. The data broadcast server of claim 11, wherein each of the plurality of backlog items includes a mutually exclusive subset of data blocks of the plurality of data blocks.

16. The data broadcast server of claim 10, wherein the data broadcast server is further configured to broadcast a backlog item page packet on a control channel while broadcasting the subset of data blocks on the broadcast data channel.

17. The data broadcast server of claim 16, wherein the backlog item page packet includes a data file identifier and a data block index.

18. The data broadcast server of claim 16, wherein the data broadcast server is further configured to broadcast the backlog item page packet on a voice channel while broadcasting the subset of data blocks on the broadcast data channel.

* * * * *